US009269239B1

United States Patent
Jensen et al.

(10) Patent No.: US 9,269,239 B1
(45) Date of Patent: Feb. 23, 2016

(54) SITUATIONAL AWARENESS SYSTEM AND METHOD

(71) Applicants: Dana J. Jensen, Marion, IA (US); Steven E. Koenck, Cedar Rapids, IA (US)

(72) Inventors: Dana J. Jensen, Marion, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/492,235

(22) Filed: Sep. 22, 2014

(51) Int. Cl.
G08B 3/00 (2006.01)
G08B 5/22 (2006.01)

(52) U.S. Cl.
CPC .......................................... *G08B 5/22* (2013.01)

(58) Field of Classification Search
CPC ........................... G09G 5/00; G02B 2027/0138
USPC ................... 340/691.6, 691.1, 691.2, 5.1, 8.1; 345/7–9, 418–427
See application file for complete search history.

(56) References Cited

U.S. PATENT DOCUMENTS

| 7,034,678 | B2 * | 4/2006 | Burkley | G01S 5/0027 340/539.11 |
|---|---|---|---|---|
| 8,681,218 | B1 | 3/2014 | Jensen et al. | |
| 2013/0187834 | A1 * | 7/2013 | Nohara | G01S 7/04 345/8 |
| 2013/0208001 | A1 * | 8/2013 | Lulue | G06F 17/30241 345/629 |

* cited by examiner

*Primary Examiner* — Toan N Pham
(74) *Attorney, Agent, or Firm* — Angel N. Gerdzhikov; Donna P. Suchy; Daniel M. Barbieri (57) ABSTRACT

A situational awareness system includes a network radio module configured to be coupled with an ad-hoc network. A portable situational awareness unit includes a sensor associated with a user for sensing data indicative of a location of a current field of view of the user in an external scene and to output a signal indicative of the location of the current field of view of the user. A receiver is configured to receive a signal indicative of a location of an object in the external scene and/or identifying information for the object. A display is configured to display a visual indicator in the current field of view of the user. A processing module is configured to generate a visual indicator indicative of identifying information for the object and a location for the object, and to provide the visual indicator to the display for display to the user.

17 Claims, 6 Drawing Sheets

SITUATIONAL AWARENESS SYSTEM AND METHOD

BACKGROUND

The inventive concepts disclosed herein are generally directed to systems and methods for providing users with situational awareness information, and more particularly, but not by way of limitation, to systems and methods of providing users with situational awareness information by displaying visual indicators in the field of view of users.

Soldiers, warfighters, rescue personnel, or other users in military, paramilitary, and civilian operations are called upon to execute a wide variety of military, rescue, disaster recovery, or reconnaissance missions in dangerous and rapidly changing conditions. For example, dangerous missions that place personnel in harm's way may include engaging hostile forces in the field (e.g., in urban, naval, or natural environments), search and rescue missions or operations, surveillance or reconnaissance missions, disaster recovery operations, relief and humanitarian aid operations, terrorist attack recovery operations, and fugitive tracking and capture operations. Providing superior situational awareness and information to personnel such as soldiers, warfighters, or rescuers is important for protecting personnel from dangers and for establishing a tactical advantage that can greatly increase the probability of survival of personnel and successful execution of missions or operations.

Typically, personnel deployed in the field gain some information through visual observation, which may be augmented with various devices such as night vision systems, optical magnification systems, portable sensors such as infrared cameras, GPS receivers, video cameras, synthetic vision systems, or navigation systems. Further, personnel may be in radio or other communication with a control center, satellite, or other ways and may receive additional information, commands, or other support in the field. However, the amount of equipment that can be carried by a user results in current systems having size, power, resolution, number of sensors, range, and other similar limitations. Further, existing personnel-carried systems relying on local sensor data are limited to a single point of view or vantage point, and generally have no access to sensors gathering data from other vantage points, and are limited to the amount of data stored locally on the system, which locally-stored data is often not current.

For example, because enemy forces commonly utilize communication equipment ranging from consumer cell phones to sophisticated military radio transceivers, the ability to visually survey an environment to identify, locate and characterize RF sources can be beneficial in a variety of applications. Visually mapping the RF sources in an environment might reveal the presence and location of enemy forces that would otherwise remain concealed and potentially lethal. Visually providing spatial awareness of the location of nearby RF sources is described in U.S. Pat. No. 8,681,218, the entirety of which is hereby incorporated herein by reference. Further, visually mapping RF sources may reveal a location of a black box, rescue beacon, cell phones, or other RF sources which may aid personnel during search and rescue operations.

As communications technology advances, personnel in the field have potential access to practically unlimited information, including information specific to the user's surroundings and situation and data captured by local and/or remote or off-site sensors. In some instances, while each individual user may be physically unable to carry certain sensors or equipment, users may nevertheless have access to data captured by sensors carried by other users or platforms.

One unexpected downside of the vast amount of data available to personnel deployed in the field is the increased cognitive workload and the time and effort expended by personnel to access, view, process, and understand relevant information in the context of the rapidly changing surroundings and highly-fluid and dangerous situations.

Accordingly, a situational awareness system and method for increasing the situational awareness of personnel by presenting contextually-relevant information in an intuitive and easy-to-understand manner would be advantageous.

SUMMARY

In one aspect, embodiments of the inventive concepts disclosed herein are directed to a situational awareness system. The system includes a network radio module configured to be coupled with an ad-hoc network and a portable situational awareness unit. The portable situational awareness unit includes a sensor configured to be associated with a user and to sense data indicative of a location of a current field of view of the user in an external scene and to output a signal indicative of the location of the current field of view of the user in the external scene. The unit also has a receiver configured to receive a signal indicative of a location of at least one object in the external scene and/or identifying information for an object in the external scene from a remote data source via the at least one network radio module. The unit further has a display configured to be associated with the user, and to display visual indicators in the current field of view of the user. The unit also has a processing module coupled with the sensor, the network radio module, and the display. The processing module has at least one processor coupled with a non-transitory processor-readable medium storing processor-executable instructions for causing the at least one processor to receive the signals, generate, at least partially based on the at least one first and second signals, a visual indicator indicative of identifying information for the object located in the external scene and a location for the object relative to the current field of view of the user, and provide the visual indicator to the display for display in the current field of view of the user.

In a further aspect, embodiments of the inventive concepts disclosed herein are directed to a method of providing situational awareness to a user. The method may include receiving, by a processor via an input port, a signal indicative of a location of a current field of view of the user in an external scene from a sensor associated with a user. The method may also include accessing, by the processor, data indicative of a location and/or identifying information for an object in the external scene. The method may further include generating, by the processor, a visual indicator indicative of the location of the object relative to the current field of view of the user and the identifying information for the object. The method may further include providing, by the processor, the visual indicator to a display associated with the user for display in the current field of view of the user.

BRIEF DESCRIPTION OF THE DRAWINGS

Like reference numerals in the figures may represent and refer to the same or similar element or function. Implementations of the instant inventive concepts may be better understood when consideration is given to the following detailed description. Such description makes reference to the annexed pictorial illustrations, schematics, graphs, drawings, and appendices, which are not necessarily to scale, and in which some features may be exaggerated and some features may be omitted or may be represented schematically in the interest of clarity. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "some embodiments," "one embodiment," or "an embodiment" means that a particular element, feature, structure, or characteristic described in connection with the embodiment is included in at least one embodiment. The appearances of the phrase "in some embodiments" in various places in the specification are not necessarily all referring to the same embodiment, and embodiments of the inventive concepts disclosed may include one or more of the features described herein, or any combination of sub-combination of two or more such features, along with any other features which may not necessarily be described or inherently present in the instant disclosure.

Broadly, exemplary embodiments of the inventive concepts disclosed herein are directed to situational awareness systems and method for providing situational awareness to a user by displaying context-sensitive visual indicators in the current field of view of the user. Embodiments of the inventive concepts disclosed herein provide a system for a user such as a warfighter or soldier to quickly and easily understand the location of objects in the current field of view in an intuitive manner, and allows the user to search for or to locate or view an object by looking around.

As used herein, the term "object" is intended to include any manmade or natural object, feature, or structure, such as person, item, terrain feature, body of water, road, city, town, border, building, animal, vehicle, platform, ship, weapon system, weapon, railroad, mountain pass, river, lake, stream, aircraft, satellite, space vehicle, power line, water tower, cell tower, unmanned aerial or water vehicle, landing zone, drop zone, extraction point, waypoint, or combinations thereof.

In some embodiments, the display may be configured to be positioned in the current field of view of the user by being implemented as one or more of: goggles, glasses, visor, night vision, heads-up display (HUD), video screen, computer monitor, laptop, tablet, handheld device screen, smartphone, smartwatch, wearable device, weapon sight, or combinations thereof.

Visual indicators may be displayed in the current field of view of the user at the location of the object in the external scene or at a location associated with or indicative of the location of the object in the external scene. In some embodiments, visual indicators may be implemented as a transparent shape, dot, icon, or label. In some embodiments, the visual indicators may be used to identify RF sources (e.g., network radios, jammers, cell towers, satellites), landmarks (e.g., buildings, cell towers, roads), and/or relevant mobile platforms (e.g., tanks, drones, satellites). In some embodiments, trajectory or direction of movement of objects (e.g., past, current, or predicted) may be indicated. Additional information in the visual indicators may include name of objects and related characteristics (e.g. frequency, power, bandwidth, modulation), Further, in some embodiments, the display may include or may be coupled with a sensor configured for tracking movement of the current field of view of the user relative to the external scene (e.g. an attitude sensor, head position sensor, eye-tracking sensor or gaze-tracking sensor) and GPS or relative position for location to minimize the equipment that must be carried/worn by the user to provide enhanced situational awareness. Embodiments of the inventive concepts disclosed herein leverage ad-hoc networking to access external scene sensor data and data available at nodes in the network (or accessible by other network nodes).

Exemplary embodiments of the inventive concepts disclosed herein are described in detail in the context of military applications where the user is a soldier. However, it is to be appreciated that the inventive concepts disclosed herein are not limited to military applications and may be implemented in any situation where increasing the situational awareness of the user is desired. For example, situational awareness systems and methods according to the inventive concepts disclosed herein may be implemented in military operations and campaigns, civilian search-and-rescue, disaster recoveries, firefighting, hunting, exploring, underwater rescue or recovery operations, law enforcement, security, or other operations and situations where increasing the situational awareness of a user is beneficial.

Figure 1:
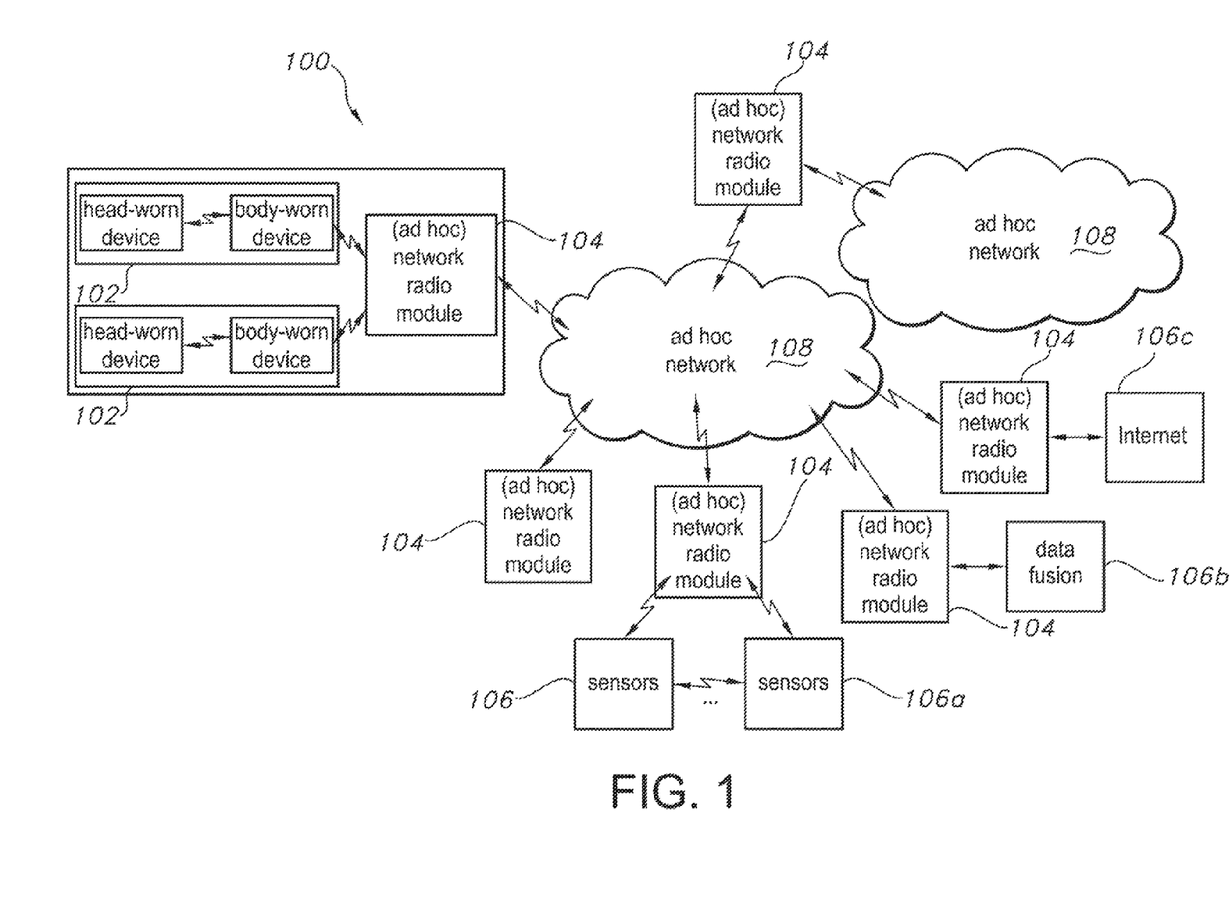
FIG. 1 is a block diagram of an exemplary embodiment of a situational awareness system according to the inventive concepts disclosed herein.

Referring now to FIG. 1, shown therein is an embodiment of a situational awareness system 100 according to the inventive concept disclosed herein. The situational awareness system 100 includes portable situational awareness units 102, network radio modules 104, and remote data sources 106, coupled with one another via a network 108. The situational awareness units 102 are described in detail with reference to FIG. 2 below.

The network radio modules 104 may be implemented as any suitable network radio devices configured to be coupled with the network 108 and to bi-directionally exchange signals and/or data with the portable situational awareness units 102, other network radio modules 104, and/or remote data sources 106 over the network 108. It is to be understood that while a plurality of network radio modules 104 are shown in FIG. 1, the inventive concepts disclosed herein may be implemented with any desired number of network radio modules 104, such as a single network radio module 104, two or more network radio modules 104, or three or more network radio modules 104. Further, in some embodiments, one or more of the network radio modules 104 may be omitted or may be incorporated into one or more of the portable situational awareness units 102 or remote data sources 106. In some embodiments, one or more of the portable situational awareness units 102 may be directly coupled with the network 108 and/or with one or more of the remote data sources 106, and one or more of the network radio modules 104 may be omitted.

The network radio modules 104 may be implemented as an ad-hoc network radio and may be configured to establish and/or maintain an Anti-Access Area Denial (A2AD) link to the network 108 or as any other desired long-range radio frequency links. In some embodiments, the network radio modules 104 may further coordinate other links between portable situational awareness units 102, data sources 106, and the network 108 as needed (e.g., via a directional C-Band socket communication link).

In some embodiments, the network radio modules 104 may include an antenna and a processor coupled with a non-transitory processor-readable medium and configured to provide data and signal management and routing. Further, the network radio modules 104 may include an input port configured to receive electrical, optical, or radio signals, and an output port configured to transmit one or more electrical, optical, or wireless signal.

The remote data sources 106 may be implemented as one or more remote sensors 106*a*, data fusion systems 106*b* configured to integrate data from multiple sources, the Internet 106*c*, or combinations thereof, for example. The remote data sources 106 are configured to exchange data with the network radio modules 104, with other remote data sources 106, and/or with the portable situational awareness units 102 over the network 108.

In some embodiments, the remote sensors 106*a* may include any desired sensors having different vantage points, such as airborne sensors, space-borne sensors, water-borne sensors, drones, unmanned aerial vehicles, radar, weather radar, satellites, imagers, infrared sensors, RF sensors, sonar, laser rangefinders, seismic sensors, lightning detectors, antennas, or combinations thereof. Further, the data fusion systems 106*b* may be configured to receive data from the remote sensors 106*a* and/or from one of more of the portable situational awareness units 102 and to integrate, combine, fuse, overlay, filter, annotate, compress, or otherwise process data which may be stored in a database and/or provided to other devices such as the portable situational awareness units 102 over the network 108.

In some embodiments, the remote data sources 106 may store, or provide data indicative of a location of one or more objects in an external scene relative to a user of a portable situational awareness unit 102. For example, location data may indicate a location of one or more objects in the external scene. In some embodiments, identifying information for objects may include one or more of: type of the object, friendly identification of the object, enemy identification of the object, distance to the object, speed of the object, past track of the object, predicted future track of the object, predicted time until the object moves into the current field of view of the user, predicted location where the object enters the current field of view of the user, predicted time until the object moves outside the current field of view of the user, predicted time until the object enters the current field of view of the user, RF frequency emitted by the object, and RF power emitted by the object.

The network 108 may be implemented as a wireless network, a radio network, a satellite network, a cellular network, a 3G network, a 4G network, a LAN network, or combinations thereof. In some embodiments, the network 108 may be an ad-hoc or mesh network and may use any desired networking protocol to enable bi-directional exchange of signals and/or data between the portable situational awareness units 102, the network radio modules 104, and the remote data sources 106. In some embodiments, two or more networks 108 may be coupled with one another via a network radio module 104 as shown in FIG. 1.

Ad-hoc networks such as the network 108 are decentralized networks where multiple nodes (e.g., portable situational awareness units 102, network radio modules 104, and/or remote data sources 106) participate in the networking by routing and forwarding data to the nodes (e.g., the portable situational awareness units 102, the network radio modules 104, and/or the remote data sources 106) via dynamic connectivity of nodes (e.g., portable situational awareness units 102, network radio modules 104, and/or remote data sources 108) within range of one another. Ad-hoc networks such as the network 108 enable each node (e.g., portable situational awareness units 102, network radio modules 104, and/or remote data sources 106) to access information from other nodes (e.g., portable situational awareness units 102, network radio modules 104, and/or remote data sources 106) in the network 108 which may in turn have access to vast stores of information, including the Internet. Ad-hoc network nodes (e.g., portable situational awareness units 102, network radio modules 104, and/or remote data sources 106) may include platforms having centralized processing of information from distributed sensors. Other nodes (e.g., portable situational awareness units 102, network radio modules 104, and/or remote data sources 106) may have access to separate networks 108 and resources. Other nodes (or 'self' node) (e.g., portable situational awareness units 102, network radio modules 104, and/or remote data sources 106) may have access to sensing data from one or more local and/or remote sensors.

Figure 2:
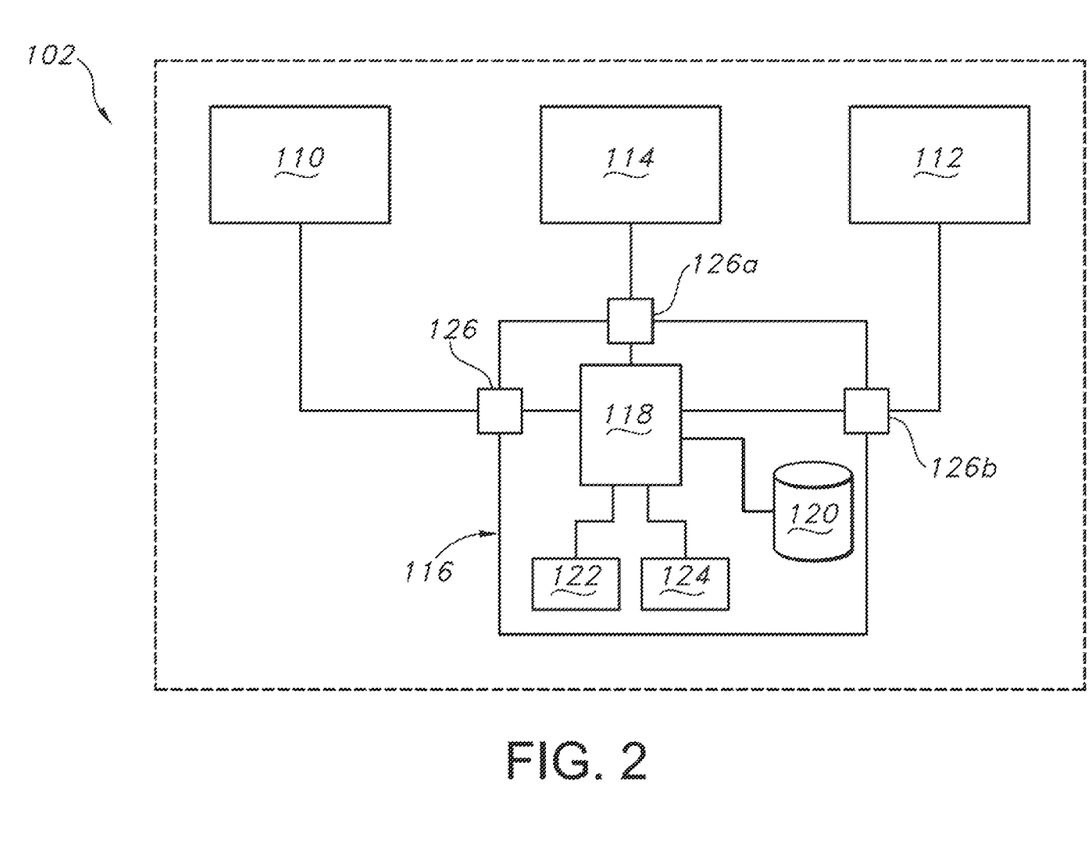
FIG. 2 is a diagram of an exemplary embodiment of a portable situational awareness unit of the situational awareness system of FIG. 1.

Referring now to FIG. 2, shown therein is an exemplary embodiment of a portable situational awareness unit 102 according to the inventive concepts disclosed herein. The portable situational awareness unit 102 may be configured to be worn by a user or to be mounted on a movable platform such as a weapon platform or vehicle, and includes a sensor 110, a transceiver 112, a display 114, and a processing module 116.

The sensor 110 may be associated with a user and may be implemented as a portable, deployable, launchable, head-worn, body-worn, or handheld device in some embodiments. The sensor 110 may include a single sensor, a sensor array, or multiple sensors configured to be associated with a user and to sense data indicative of a location of a current field of view of the user in an external scene. The sensor 110 is further configured to output signals indicative of the location of the current field of view of the user in the external scene. The sensor 110 may be a head-worn or body-worn sensor in some embodiments, and may be configured to detect, calculate, or otherwise determine a location and movement of a current field of view of a user relative to the external scene. The sensor 110 may be or may include a GPS sensor or receiver, an attitude sensor, a gyroscope, an eye-tracking sensor, a head position sensor, or combinations thereof.

In some embodiments, the sensor 110 may include an imaging sensor configured to capture an image, a sequence of images, or a video of the external scene with any desired resolution, refresh-rate, or quality. Further, in some embodiments the sensor 110 may include an infrared sensor, a radio frequency sensor, a radar, a sonar, a microphone, a laser rangefinder, or combinations thereof, configured to capture images or data from the external scene and to transmit signals indicative of the captured images or data to the processing module 116 via a short-range or a medium-range wireless link. In some embodiments, the sensor 110 may be implemented as a physically separate device, which may be coupled with the processing module 116 via a wired or wireless link, while in some embodiments, the sensor 110, the display 114, and/or the processing module 116 may be implemented as a unitary device.

The transceiver 112 is configured to exchange data and/or signals with the network radio module 104 and/or with a transceiver 112 of another portable situational awareness unit 102. In some embodiments, the transceiver 112 may be configured to interface and/or exchange signals and/or data with the network 108 and/or with one or more of the remote data sources 106. In some embodiments, the transceiver 112 may be implemented as a wireless transceiver configured to exchange signals with the network radio module 104, the network 108 or another transceiver 112 via any desired wireless link (e.g., medium range) and protocol (e.g., Bluetooth link, generic radio frequency link, 802.11, or combinations thereof).

The display 114 is configured to be associated with the user (e.g., by being implemented as a portable handheld, body-worn, or head-worn device), and to display images and/or visual indicators in the current field of view of the user. In some embodiments, the display 114 may be implemented as a helmet visor, goggles, face shield, windshield, glasses, synthetic vision display, head-up display, weapon sight, or other similar see-through display and may include at least one transparent portion configured to be positioned in the current field of view of the user such that the current field of view of the user is directed through the at least one transparent portion of the display 114. For example, the display 114 may be associated with the user by being implemented as a head worn display 114 such as by being incorporated into a helmet visor, goggles, glasses, face shield, gas mask, or combinations thereof. In some embodiments where the display 114 is head worn, the display 114 may be integrated with a portion of the sensor 110, or the sensor 110 and the display 114 may be implemented as a unit. The display 114 may further include a processor and a memory and may be configured to provide basic processing of images and/or videos as will be appreciated by a person of ordinary skill in the art having the benefit of the instant disclosure.

In some embodiments where the display 114 is a transparent display through which the user views an external scene, one or more visual indicators may be overlaid onto the display 114 at a location corresponding to or associated with a relative location of an object in the current field of view of the user as described in more detail below. In some embodiments, where one or more images of the external scene in the current field of view of the user is displayed by the display 114, one or more visual indicators may be overlaid on the image at a location corresponding to or associated with the location of an object in the current field of view of the user as described in more detail below. In some embodiments, the display 114 may include one or more portions or areas of view configured as standard computer monitor in addition to, or rather than, to overlay contextual visual indicators (e.g. view repair document or a map).

In some embodiments, the display 114 may be implemented as a hand-held device such as a tablet, smartphone, laptop, monitor, smartwatch, a weapon sight or weapon system display, or combinations thereof. Further, in some embodiments, the display 114 may be implemented as a cockpit display, a vehicle dashboard display, or combinations thereof. Further, in some embodiments the display 114 may include one or more speakers or haptic feedback devices for providing additional information to a user and/or for providing output from the processing module 116 to the user. Further, the display 114 may be customizable such as by customizing colors, brightness, transparency, icons, sizes, fill texture, zoom level, or combinations thereof.

The processing module 116 includes at least one processor 118 coupled with a non-transitory processor-readable medium 120 storing processor-executable instructions, an input device 122, and an output device 124. The processing module 116 may be implemented as a portable device such as a body-worn or man-pack device such as a smartphone, a tablet, a processing unit, or combinations thereof. In some embodiments, the processing module 116 may be wirelessly coupled with the sensor 110 and/or with the display 114 via a wired link or via a short-range wireless or RF link, such as Bluetooth, near field communications (NFC), or combinations thereof. Further, in some embodiments, the processing module 116 may be coupled with one or more network radio modules 104 via a medium-range wireless or RF link, and with one or more remote data sources 106 or other portable situational awareness units 102 via the network 108.

The processor 118 is coupled with and exchanges data and/or signals with the sensor 110 via an I/O port 126 (e.g., via a wired or short-range wireless or RF link), the display 114 with an I/O port 126a (e.g., via a wired or short-range wireless or RF link), and with the transceiver 112 via an I/O port 126b (e.g., via a wired or short-range wireless or RF link).

The processor 118 may be implemented as at least one central processing unit, a digital signal processor, a multi-core processor, an application specific integrated circuit, a field-programmable gate array, or combinations thereof. The processor 118 is configured to exchange data and/or signals with the sensor 110, the display 114, the transceiver 112 and/or the network radio unit 104 and to access and execute processor-executable instructions from the non-transitory processor-readable medium 120 to carry out the functionality described below.

The processor 118 is coupled with I/O ports 126, 126a, and 126b which may function similarly to one another and may be implemented as a computer port, a virtual port, an electrical port, a wireless port, an optical port, a virtual port, a physical port, or combinations thereof. The I/O ports 126, 126a and 126b are configured to allow the processor 118 to exchange data and/or signals with the sensor 110, the transceiver 112, and the display 114.

The non-transitory processor-readable medium 120 may be implemented as a non-transitory computer memory such as a hard drive, a solid state drive, ROM memory, flash memory, CD, DVD, floppy disk, database, or combinations thereof. The non-transitory processor-readable medium 120 stores data and processor-executable instructions for the processor 118 to carry out the functionality described herein. The processor-executable instructions may be stores in any desired programming language or structure, and may be stored as software, firmware, object code, machine code, source code, or in any other desired format, or combinations thereof.

The input device 122 may be implemented as a keyboard, touchscreen, mouse, joystick, buttons, microphone, eye-tracking sensor, or combinations thereof, and is configured to receive input from a user and to transmit one or more signals indicative of the input to the processor 118.

The output device 124 may be configured to provide information in a format perceivable by a user, and may be implemented as a display, screen, speaker, headphones, earpiece, haptic feedback device, optical feedback device, or combinations thereof.

In some embodiments, the output device 124 and the input device 122 may be implemented as a unitary device. Further, in some embodiments the output device 124 may be integrated with the display 114, or may be omitted and the processor 118 may provide output to a user through the display 114.

Figure 3:
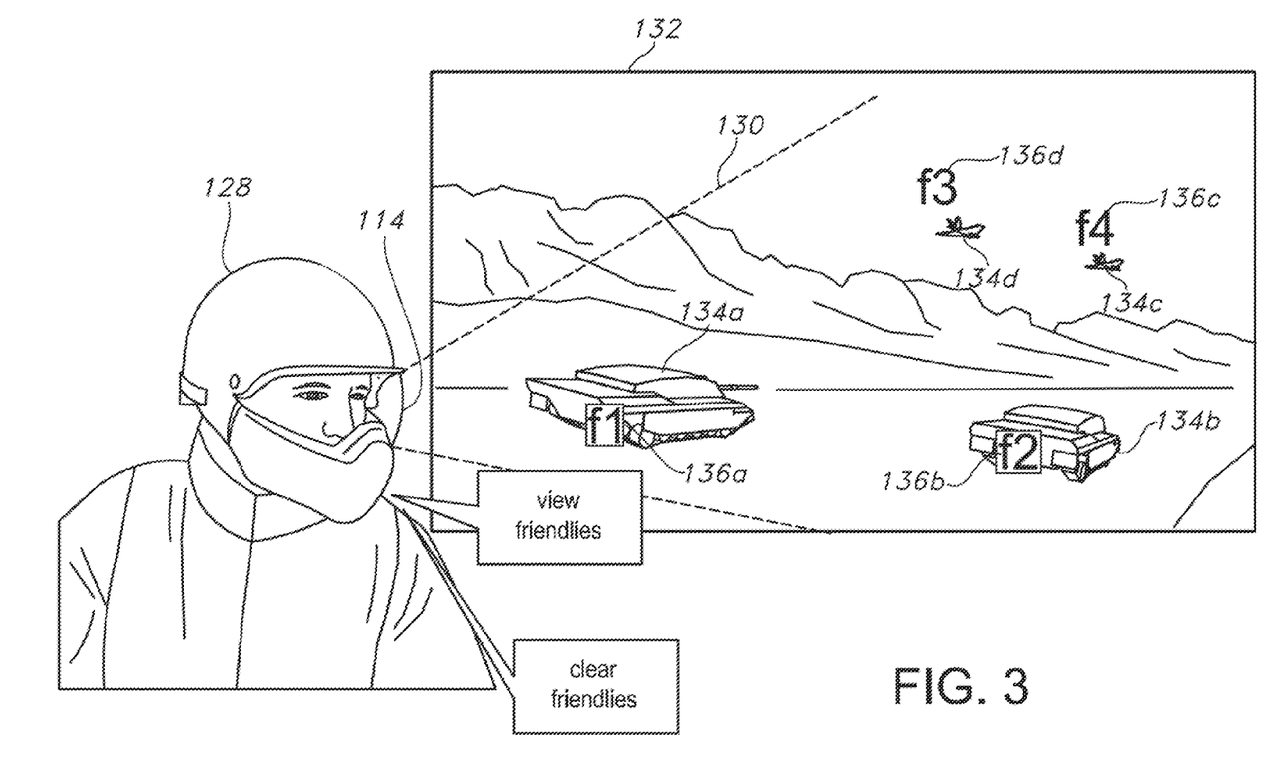
FIG. 3 is an exemplary embodiment of a visual indicator provided to a user by a situational awareness system according to the inventive concepts disclosed herein.
Figure 4:
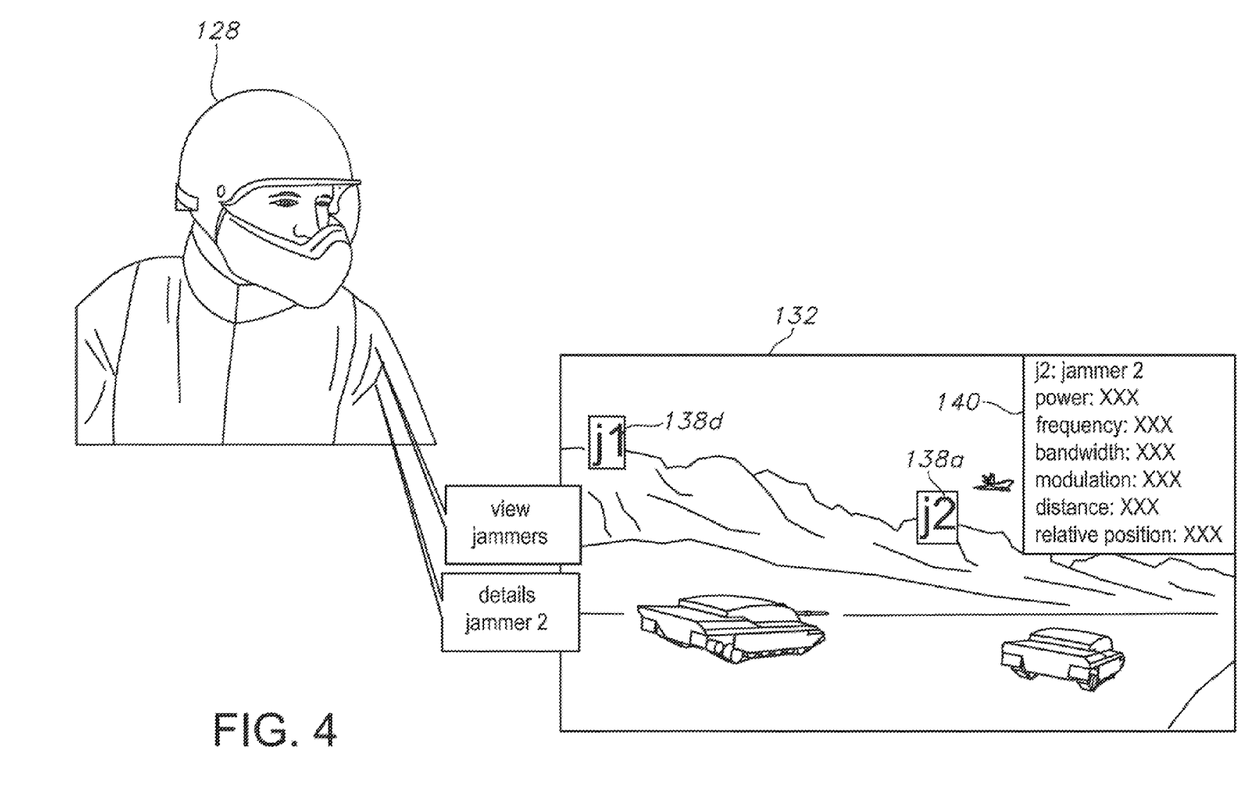
FIG. 4 is an exemplary embodiment of a visual indicator provided by a situational awareness system according to the inventive concepts disclosed herein.
Figure 5:
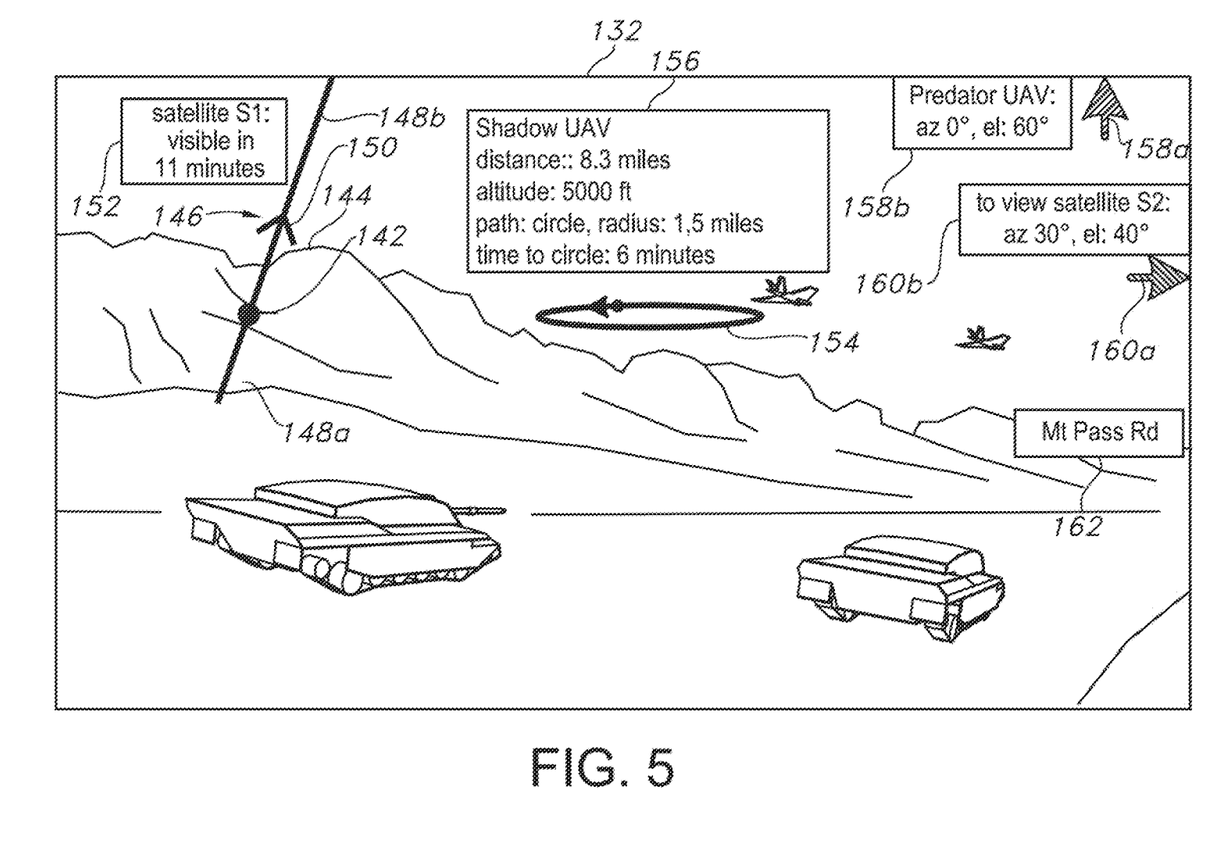
FIG. 5 is an exemplary embodiment of a visual indicator provided by a situational awareness system according to the inventive concepts disclosed herein.

Referring now to FIGS. 3-5 in operation, the situational awareness system 100 may function as follows. One, two, or more portable situational awareness units 102 may be deployed by one or more users 128 in the field, which may be co-located, dispersed in the field, or located at separate locations adjacent to or remote from one another. In some embodiments, a single portable situational awareness unit 102 may be coupled with the network 108 via a single network radio module 104, and in some embodiments two or more portable situational awareness units 102 may be coupled with the network 108 via a single network radio module 104, or combinations thereof.

The sensor 110 of each of the situational awareness units 102 is associated with a respective user 128 so that a location, position, orientation, direction, or any other desired characteristic of a current field of view 130 of the user 128 in the external scene 132 may be captured, detected, calculated, or otherwise determined by the sensor 110. In some embodiments, the sensor 110 may further capture images, video, RF sources, or any other information from the external scene 132 (e.g., both from the external scene 132 within the current field of view 130 of the user 128 and from the external scene 132 outside the current field of view 130 of the user 128). The sensor 110 may provide one or more signals to the processing unit 116 indicative of the captured external scene data and/or of the location of the current field of view 130 of the user 128 in the external scene 132.

The processor 118 of the processing unit 116 may receive one or more signals from the network radio unit 104, which may include identifying data for an object and any other data from one or more remote data source 106. In some embodiments, the processor 118 may receive one or more signals from a transceiver 112 and/or a network radio unit 102 indicative of data or images captured by a sensor of another portable situational awareness system 102 deployed in the field (e.g., in the external scene 132). In some embodiments, where a friendly object deployed in the field (e.g., within or outside the field of view 130 of the user 128) has image of data capture capabilities, the processor 118 may receive (e.g., automatically or responsive to a request or selection by the user 128) signals indicative of data or images from the friendly object via the network radio module 104 and/or the transceiver 112.

Based on the location of the current field of view 130 of the user 128 in the external scene 132 and/or on the location of one or more objects in the external scene 132 and/or identification data for the one or more objects received by the processor 118, the processor 118 may generate one or more visual indicators 136 and may provide the visual indicators 136 to the display 114 for display in the current field of view 130 of the user 128. The visual indicators 136 may be implemented as shapes, dots, icons, graphical symbols, alphanumeric labels or symbols, object outlines, object contours, phantom outlines of objects, feature indicators, colors (e.g., blue for friendly, red for enemy, and green for allies), crosshatching or other patterns, transparencies, shadows, shapes (e.g., circle, oval) drawn around an object or an area associated with the object, or combinations thereof, and may be indicative of a location and identifying information for objects in the external scene 132 where the portable situational awareness unit 102 is deployed. In some embodiments, the visual indicators 136 may be static, and in some embodiments the visual indicators may move, flicker, flash, blink, change colors, change shapes, or otherwise dynamically indicate information about location and identity of object to users of the portable situational awareness system 102. In some embodiments, one or more objects of interest may be detected in the external scene by the sensor 110 of a situational awareness unit 102 and/or by an object such as a satellite, a drone, or weather or other radar, and information indicative of a visual indicator of the object of interest along with directions to move the current field of view 130 of the user 128 of a situational awareness units 102 may be transmitted via the network 108 to one or more other situational awareness units 102.

Further, in some embodiments where the sensor 110 is configured to capture images or video of the external scene 132, the processor 118 may transmit one or more signal indicative of the images or video captured by the sensor 110 to the network radio unit 104 and/or to one or more other portable situational awareness systems 102. The processor 118 may also transmit any other data captured by the sensor 110, such as the location of the current field of view 130 of the user 128 in the external scene 132, the location or identifying information for objects in the external scene 132, or combinations thereof.

In some embodiments, the portable situational awareness unit 102 may be configured to record images, video, or data captured by the sensor 110 for any desired duration of time, and may store the recorded data locally in the non-transitory processor-readable medium 120, may upload the data to the network 108 in real time, intermittently, or in response to a user 128 command. The captured data may be provided to the network 108 or to other portable situational awareness units 102, or may be stored or processed by one or more of the remote data sources 106, or combinations thereof.

As shown in FIG. 3, the current field of view 130 of the user 128 may include one or more friendly objects 134 which are visible in the current field of view 130 of the user 128, and the visual indicator 136 may be displayed by the display 114 in the current field of view 130 of the user 128 at a location corresponding to, or associated with, a relative location of the object 134 visible in the current field of view 130 of the user 128. For example, FIG. 3 shows four friendly objects 134*a-d* and corresponding visual indicators 136*a* (f1) and 136*b* (f2) which are shown overlaid onto objects 134*a* and 134*b* respectively, and visual indicators 136*c* (f3) and 136*d* (f4) which are shown located at locations associated with objects 134*c* and 142*d* respectively. In some embodiments where the object 134 is visible in the current field of view 130 of the user 128 and is readily recognizable by the user 128, the visual indicator 136 may be presented as a simple friendly or enemy indicator as shown in FIG. 3, and may be provided in response to a request by the user 128 (e.g., verbal command) to identify friendly objects, enemy objects, or unknown objects, or combinations thereof.

It is to be appreciated that visual indicators according to the inventive concepts disclosed herein, such as the visual indicator 136, may be provided to the user 128 automatically or in response to a local or remote command, may be provided in response to a request or command form the user 128, may be provided in response to an object of interest being present in the external scene, or may be toggled on or off as desired.

Referring now to FIG. 4, in some instances an object may be positioned in the field of view 130 of the user 128 but may be concealed or otherwise unobservable by the user 128. In this example, the object is an enemy jammer emitting radiofrequency signals. Visual indicators 138*a* (j1) and 138*b* (j2) may be displayed in the current field of view 130 of the user 128 at locations associated with objects which are a source of jamming radio frequency signals. Additionally, a visual indicator 140 may be displayed in the current field of view 130 of the user 128 at a location associated with an object identified as a jammer (e.g., adjacent to or otherwise associated with the visual indicator 138*b* in this instance), and may indicate any desired pertinent information, such as identifying information for the object, radio frequency signal power of the object, radio frequency, bandwidth, or modulation of the object, duty cycle hopping times, time slots, distance to the object, and relative position (e.g., relative to the user 128 and/or including GPS or other coordinates of the object). The visual indicator 140 may be toggled on/off and may be provided in response to a request or selection by the user 128 (e.g., via a verbal command provided by the user 128 via the input device 122).

In some embodiments, the portable situational awareness unit 102 may transmit information about enemy or unidentified objects to one or more other portable situational awareness units 102 or to the network 108 via the network radio module 104. Further, in some embodiments the relative power or other data of the RF emission of the jammers may be indicated with a visual indicator similar to the indicia indicating RF sources described in U.S. Pat. No. 8,681,218.

As shown in FIG. 5, in some embodiments an object 142 (in this instance a satellite) may be obscured in the current field of view 130 of the user 128 by an obscuring object 144 (in this instance a mountain ridge), and a visual indicator 146 may be formatted to be displayed in the current field of view 130 of the user 128 over the obscuring object 144 so as to indicate the relative location of the obscured object 142 behind the obscuring object 144. Further, the visual indicator 146 includes a portion 148*a* indicative of a past path or track of the obscured object 142 behind the obscuring object 144, and a portion 148*b* indicative of a predicted path or track of the obscured object 142 once the obscured object 142 becomes visible in the current field of view 130 of the user 128. For example, a point or location where the portion 148*b* intersects with or touches the obscuring object 144 may be indicative of a predicted location where the obscured object 142 is expected to become visible in the current field of view 130 of the user 128.

In some embodiments, the visual indicator 146 may include a direction indicator 150 (an arrow in this instance) indicative of a direction of movement of the obscured object 142. In some embodiments, the visual indicator 146 may also include a portion 150 indicative of an identity of the obscured object 142 (satellite S1 in this instance), and an estimated time until the obscured object 142 becomes visible in the current field of view 130 of the user 128 (11 minutes in this instance). It is to be understood that the portion 150 may be omitted, or may include any other identifying information for the obscured object 142 or for any other object as described herein.

Conversely, where the object 142 is moving in the opposite direction, e.g., going from a visible object to an obscured object in the current field of view 130 of the user 128, the visual indicator 146 may indicate one or more of: a location (e.g., a point on the obscuring object 144) where the object 142 will become obscured, a time until the object 142 becomes obscured, a direction of movement of the object 142, or combinations thereof. The visual indicator 146 shown in FIG. 5 indicates the past track or path of the obscured object 142 and the predicted future path of the obscured object 142 including a location where the obscured object 142 is expected to enter the current field of view 130 of the user 128. Further, the visual indicator 146 includes identifying information for the obscured object 142 and an estimated time until the obscured object 142 enters the current field of view 130 of the user 128.

In some embodiments, the object 142 may be configured to capture images, video, weather data, or any other data from the external scene 132 from a vantage point different from the vantage point of the user 128 and to transmit the data of the external scene 132 to the portable situational awareness unit 102 via the network 108. In such instances, the user 128 may request an image of video feed from the object 142 which feed may be displayed in the current field of view 130 of the user 128 at any desired location, including an image region, a pop-up image tile, a full-screen image feed, or combinations thereof. The portable situational awareness unit 102 may be configured to allow the user 128 to zoom in or out, pause, rewind, and speed up, slow down, or extract images from the feed, in some embodiments.

In some embodiments, visual indicators according to the inventive concepts disclosed herein may indicate a direction to move the location of the current field of view 130 of the user 128 to bring an object positioned outside the current field of view 130 of the user 128 into the current field of view 130 of the user 128. For example, understanding that the current field of view 130 of the user 128 has a horizontal component and a vertical component, visual indicators may indicate a direction, such as left, right, up, down, north, south, east, west, or combination thereof the current field of view 130 of the user 128 is to be moved to bring in an object into the current field of view 130 of the user 128. In some embodiments, an amount of movement, a degree to turn, raise, or lower the current field of view 130 of the user 128 may be indicated by a visual indicator.

For example, as shown in FIG. 5, in some embodiments an object may be located outside the current field of view 130 of the user 128, in which instance a visual indicator 154 may be displayed indicative of a ground projection of the object. In this instance the object is an unmanned aerial vehicle (UAV)

positioned above the current field of view 130 of the user 128. The visual indicator 154 is indicative of a ground projection of a path, track, or shadow of the UAV, a direction of movement of the UAV, and a relative location of the UAV along the ground track projection. Further, a visual indicator 156 may be displayed at a location adjacent to or otherwise associated with the visual indicator 154, and may be indicative of identifying information for the object (Shadow UAV in this instance), distance to the object (8.3 miles in this instance), altitude of the object (5000 feet in this instance), shape and other information about the path of the object (e.g., circular path with a radius of 1.5 miles in this instance), and a time to complete the path (6 minutes in this instance).

In some embodiments, the Shadow UAV may be configured to capture images or video of the external scene 132 from a vantage point different from the vantage point of the user 128 and to transmit the images of the external scene 132 to the portable situational awareness unit 102 via the network 108. In such instances, the user 128 may request an image or video feed from the shadow UAV, which feed may be displayed in the current field of view 130 of the user 128 at any desired location, including being overlaid on the external scene 132, an image region, a pop-up image tile, a full-screen image feed, or combinations thereof. In some embodiments, the portable situational awareness system 102 may be configured to allow the user 128 to control the movement of and/or data capture by the Shadow UAV as will be appreciated by persons of ordinary skill in the art having the benefit of the instant disclosure.

Further, in some embodiments one or more objects may be located in the external scene 132 outside the current field of view 130 of the user 128. For example, an object may be located above the current field of view 130 of the user 128, and visual indicators 158a and 158b may be displayed in the upper portion of the current field of view 130 of the user 128. The visual indicator 158a may be implemented as a pointer, arrow, or other indicator indicative of the presence of an object of interest above the current field of view 130 of the user 128. Further, the visual indicator 158b may be displayed at a location adjacent to or otherwise associated with the location of the visual indicator 158a and may be indicative of an identity of the object (Predator UAV in this instance), and allocation of the object relative to the current field of view 130 of the user 128 (azimuth 0°, elevation 60° in this instance). The visual indicators 158a and 158b may be configured to indicate to the user 128 a direction (up in this instance) and an amount (60° in this instance) to move the current field of view 130 of the user 120 so as to bring the object (the Predator UAV in this instance) in the current field of view 130 of the user 128.

In some embodiments, the Predator UAV may be configured to capture images or video of the external scene 132 from a vantage point different from the vantage point of the user 128 and to transmit the images of the external scene to the portable situational awareness unit 102 via the network 108. In such instances, the user 128 may request an image or video feed from the Predator UAV, which feed may be displayed in the current field of view 130 of the user 128 at any desired location, including an image region, a pop-up image tile, a full-screen image feed, or combinations thereof. In some embodiments, the user 128 may be able to control the Predator UAV, including deploying an on-board weapons system of the Predator UAV, by using the portable situational awareness unit 102 to transmit one or more control signal to the Predator UAV via the network radio module 104, or the network 108, to target and/or fire the weapons system as appropriate. In some embodiments, the portable situational awareness system 102 may be configured to allow the user 128 to control the movement of and/or data capture by the Predator UAV as will be appreciated by persons of ordinary skill in the art having the benefit of the instant disclosure.

Similarly, where an object (Satellite S2 in this instance) is located outside the current field of view 130 of the user 138, visual indicators 160a and 160b may be displayed to the user 128 adjacent to the side to which the object is located in the external scene 132. The visual indicator 160a may be implemented similarly to the visual indicator 158a and may be indicative of the presence of an object of interest to the right of the current field of view 130 of the user 128 in this example. The visual indicator 160b may be displayed at a location adjacent to or otherwise associated with the location of the visual indicator 160a and may be indicative of a direction (e.g., azimuth 30°), an elevation (e.g., 40°), and a direction for the user 128 to move the current field of view 130 to view the object, or to bring the object into the current field of view 130 of the user 128.

In some embodiments, a visual indicator 162 may be displayed in the current field of view 130 of the user 128 to indicate a waypoint, terrain feature, road, railroad, or other information. In this instance, the visual indicator 162 is overlaid onto a road, and the road is identified as a Mountain Pass Road. However, visual indicators according to the inventive concepts disclosed herein may be displayed to help the user 128 locate and identify a waypoint, a road, a railroad, a body of water, a town, city, or settlement, a landing zone, an extraction point, locations of other portable awareness systems 102 in the external scene 132, weapon caches, supply drops, fire hydrants, campsites, and any other object relevant to the mission of task the user 128 is carrying out in the external scene 130.

Figure 6:
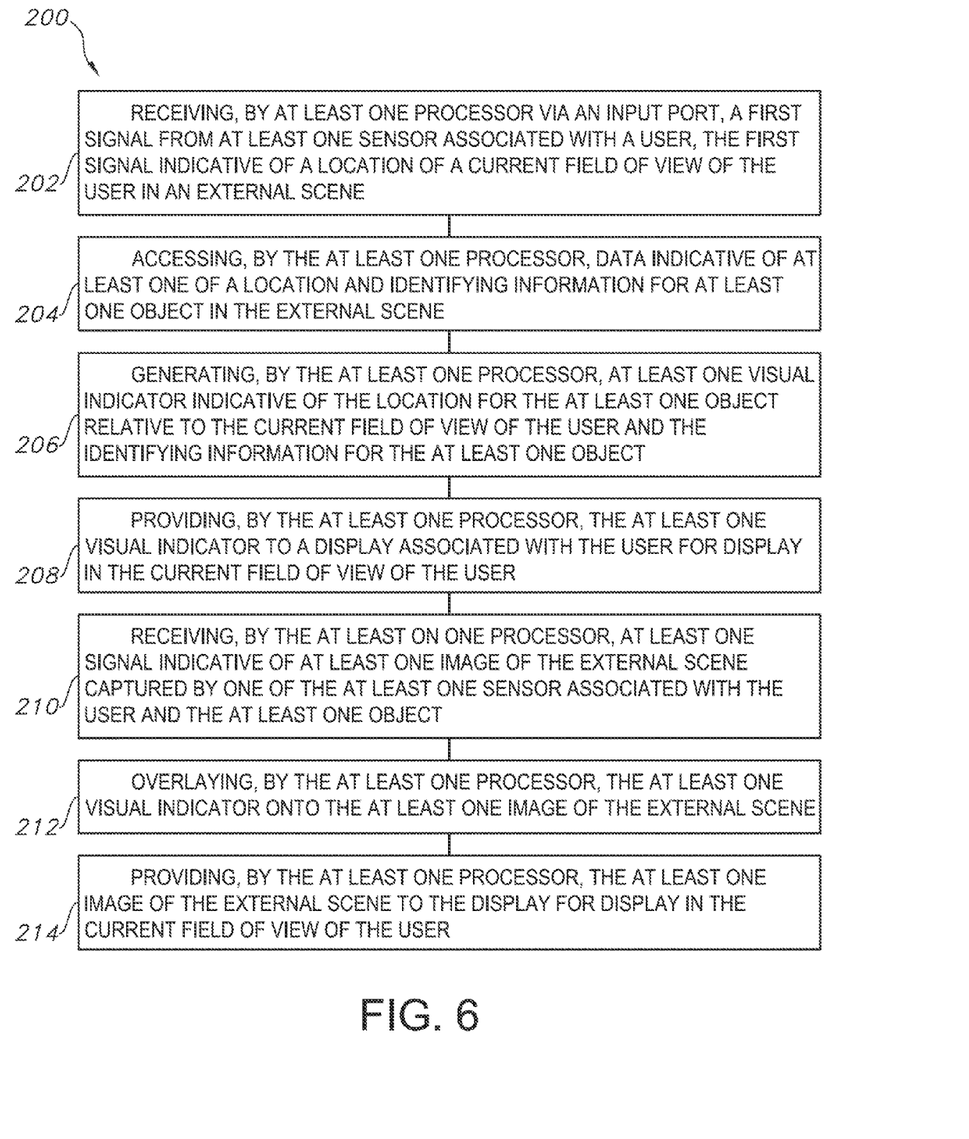
FIG. 6 is a block diagram of an exemplary embodiment of a method of enhancing situational awareness according to the inventive concepts disclosed herein.

Referring now to FIG. 6, an exemplary embodiment of a method 200 of providing situational awareness to a user according to the inventive concepts disclosed herein is shown. The method may be carried out using a situational awareness system according to the inventive concepts disclosed herein and may be carried out in a variety of military or civilian situations.

A step 202 may include receiving, by at least one processor via an input port, a first signal from at least one sensor associated with a user, the first signal indicative of a location of a current field of view of the user in an external scene.

A step 204 may include accessing, by the at least one processor, data indicative of at least one of a location and identifying information for at least one object in the external scene.

A step 206 may include generating, by the at least one processor, at least one visual indicator indicative of the location for the at least one object relative to the current field of view of the user and the identifying information for the at least one object, A step 208 may include providing, by the at least one processor, the at least one visual indicator to a display associated with the user for display in the current field of view of the user.

An optional step 210 may include receiving, by the at least on one processor, at least one third signal indicative of at least one image of the external scene. The at least one image of the external scene may be captured by one or both of the at least one sensor associated with the user and the at least one object.

A step 212 may include overlaying, by the at least one processor, the at least one visual indicator onto the at least one image of the external scene captured by the at least one sensor associated with the user.

A step 214 may include providing, by the at least one processor, the at least one image of the external scene captured by the at least one sensor associated with the user and the at least one visual indicator to the display for display in the current field of view of the user.

It is to be understood that embodiments of methods for providing situational awareness to a user according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps.

As will be appreciated by persons of ordinary skill in the art, embodiments of systems according to the inventive concepts disclosed herein leverage ad-hoc networks to make information available that is relevant to the user (e.g. sensed in the local environment, sensed remotely, result of sensor fusion), while also taking advantage of more traditional data sources (e.g., the Internet, databases) the system has direct access to (e.g., via node in same ad-hoc network) or indirect access to (e.g., via nodes and/or networks accessible by nodes the system has direct access to). Embodiments of the inventive concepts disclosed herein may be used with relative position information (e.g. GPS denied) and/or can be implemented with appropriate interconnect between the various components described herein (e.g., wired, wireless, encrypted, Low Probability of Intercept/Low Probability of Detection) making situational awareness systems and methods according to the inventive concepts disclosed herein useful in a variety of tactical situations (including Anti-Access Area Denial).

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A situational awareness system, comprising:
   at least one network radio module configured to be coupled with an ad-hoc network;
   at least one portable situational awareness unit, including:
      at least one sensor configured to be associated with a user and to sense data indicative of a location of a current field of view of the user in an external scene and to output at least one first signal indicative of the location of the current field of view of the user in the external scene;
      a receiver configured to receive at least one second signal from a remote data source via the at least one network radio module, the at least one second signal indicative of at least one of: a location of at least one object in the external scene and identifying information for at least one object in the external scene;
      a display configured to be associated with the user and to display at least one visual indicator in the current field of view of the user; and
      a processing module coupled with the at least one sensor, the at least one network radio module, and the display, the processing module having at least one processor coupled with a non-transitory processor-readable medium storing processor-executable instructions for causing the at least one processor to:
         receive the at least one first and second signals;
         generate, at least partially based on the at least one first and second signals, at least one visual indicator indicative of identifying information for the at least one object located in the external scene and a location for the at least one object relative to the current field of view of the user; and
         provide the at least one visual indicator to the display for display in the current field of view of the user.

2. The system of claim 1, wherein the display includes at least one transparent portion configured to be positioned in the current field of view of the user such that the current field of view of the user is directed through the at least one transparent portion of the display.

3. The system of claim 2, wherein the at least one object is visible in the current field of view of the user, and wherein the at least one visual indicator is displayed at a location associated with the at least one object visible in the current field of view of the user.

4. The system of claim 1, wherein the at least one object is obscured in the current field of view of the user by an obscuring object, and wherein the at least one visual indicator is formatted to be displayed in the current field of view of the user over the obscuring object so as to indicate at least one of: a relative location of the at least one object behind the obscuring object, and a path of the at least one object behind the obscuring object.

5. The system of claim 1, wherein the at least one object is located outside the current field of view of the user, and wherein the at least one visual indicator is further indicative of at least one of a direction and a distance to move the current field of view of the user so as to bring the at least one object within the current field of view of the user.

6. The system of claim 5, wherein the at least one object is located above the current field of view of the user, and wherein the at least one visual indicator is further indicative of at least one of: a ground projection of the at least one object and a path of the at least one object.

7. The system of claim 1, wherein the at least one sensor is further configured to capture at least one image of the external scene and to transmit at least one third signal indicative of the at least one image of the external scene, and wherein the non-transitory processor-readable medium further stores processor-executable code for causing the least one processor to:
   receive the at least one third signal indicative of the at least one image of the external scene;
   overlay the at least one visual indicator onto the at least one image of the external scene; and
   provide the at least one image of the external scene and the at least one visual indicator to the display for display in the current field of view of the user.

8. The system of claim 7, wherein the non-transitory processor-readable medium further stores processor-executable code for causing the least one processor to transmit at least one fourth signal to the at least one network radio module, the at least one fourth signal indicative of the at least one image of the external scene captured by the at least one sensor.

9. The system of claim 1, wherein the identifying information for the at least one object includes at least one of: type of the at least one object, friendly identification of the at least one object, enemy identification of the at least one object, distance to the at least one object, speed of the at least one object, past track of the at least one object, predicted future track of the at least one object, predicted time until the at least one object moves into the current field of view of the user, predicted location where the at least one object enters the current field of view of the user, predicted time until the at least one object moves outside the current field of view of the user, predicted time until the at least one object enters the current field of view of the user, RF frequency emitted by the at least one object, and RF power emitted by the at least one object.

10. The system of claim 1, wherein the at least one object is configured to capture images of the external scene and wherein the non-transitory processor-readable medium further stores processor-executable instructions for causing the at least one processor to:
- receive at least one third signal indicative of at least one image of the external scene captured by the at least one object;
- overlay the at least one visual indicator onto the at least one image of the external scene; and
- provide the at least one image of the external scene captured by the at least one object and the at least one visual indicator to the display for display in the current field of view of the user.

11. The system of claim 10, wherein the current field of view of the user has a first vantage point, and wherein the at least one image of the external scene captured by the at least one object has a second vantage point different from the first vantage point.

12. The system of claim 10, wherein the at least one third signal is received from at least one of: the at least one object and the at least one network radio module.

13. The system of claim 1, wherein the at least one portable situational awareness unit is at least one first portable situational awareness unit, further comprising at least one second situational awareness unit coupled with the at least one network radio module, and wherein the at least one second situational awareness unit includes at least one sensor configured to capture at least one image of the external scene and to output at least one signal indicative of the at least one image of the external scene, and a transmitter configured to transmit the at least one signal to the network radio module, and wherein the non-transitory processor-readable medium of the at least one first portable situational awareness unit further stores processor-executable instructions for causing the at least one processor to:
- receive at least one third signal indicative of the at least one image of the external scene captured by the at least one second portable situational awareness unit;
- overlay at least one visual indicator onto the at least one image of the external scene captures by the at least one second portable situational awareness unit; and
- provide the visual indicator and the at least one image of the external scene captures by the at least one second portable situational awareness unit to the display for display in the current field of view of the user.

14. The system of claim 13, wherein the at least one first portable situational awareness unit has a current field of view of the user from a first vantage point, and wherein the at least one second portable situational awareness unit has a current field of view of the user from a second vantage point different from the first vantage point.

15. A method of providing situational awareness to a user, comprising:
- receiving, by at least one processor via an input port, a first signal from at least one sensor associated with a user, the first signal indicative of a location of a current field of view of the user in an external scene;
- accessing, by the at least one processor, data indicative of at least one of a location and identifying information for at least one object in the external scene;
- generating, by the at least one processor, at least one visual indicator indicative of the location of the at least one object relative to the current field of view of the user and the identifying information for the at least one object; and
- providing, by the at least one processor, the at least one visual indicator to a display associated with the user for display in the current field of view of the user.

16. The method of claim 15, further comprising:
- receiving, by the at least one processor, at least one second signal indicative of at least one image of the external scene captured by the at least one sensor associated with the user;
- overlaying, by the at least one processor, the at least one visual indicator onto the at least one image of the external scene captured by the at least one sensor associated with the user; and
- providing, by the at least one processor, the at least one image of the external scene captured by the at least one sensor associated with the user and the at least one visual indicator to the display for display in the current field of view of the user.

17. The method of claim 16, further comprising:
- receiving, by the at least one processor, at least one third signal indicative of at least one image of the external scene captured by the at least one object;
- overlaying, by the at least one processor, the at least one visual indicator onto the at least one image of the external scene captured by the at least one object; and
- providing, by the at least one processor, the at least one image of the external scene captured by the at least one object and the at least one visual indicator to the display for display in the current field of view of the user.

* * * * *